3,262,923
MONOAZO STILBENE DYESTUFFS CONTAINING A HALOPYRIMIDINO RADICAL
Herbert Francis Andrew and Donald Buckley, Manchester, England, assignors to Imperial Chemical Industries Limited, London, England, a corporation of Great Britain
No Drawing. Filed Aug. 22, 1963, Ser. No. 303,934
Claims priority, application Great Britain, May 13, 1960, 16,938/60
4 Claims. (Cl. 260—154)

This application is a continuation-in-part of our application Serial No. 107,638, filed May 4, 1961, and relates to new azo dyestuffs of the trichloropyrimidine series valuable as reactive dyestuffs for textile materials containing active hydrogen, for example natural and regenerated cellulose and animal and polyamide textile fibres.

According to the invention there are provided the new azo dyestuffs which, in the free acid form, are of the formula:

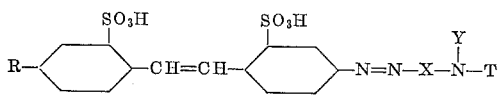

wherein R represents a chlorine or bromine atom, a nitro group, an acetamido or benzoylamino group, a dimethylamino group, or a 1':2':4:5-naphthatriazol-2-yl group which is substituted by sulphonic acid, X represents a 1,4-phenylene or a 1,4-naphthylene radical which may be substituted by methyl, methoxy, acetamido and/or sulphonic acid groups, Y represents hydrogen or a lower alkyl radical and T represents a trichloro- or tribromo-pyrimidyl radical.

As examples of alkyl radicals represented by Y there may be mentioned methyl, ethyl and butyl.

The exact configuration of the trihalogeno pyrimidyl radical represented by T is not known with certainty. It is probable that this radical is a 4:5:6-trihalogenopyrimid-2-yl radical, but it is also possible that it is a 2:5:6-trihalogenopyrimid-4-yl radical.

The new azo dyestuffs can be obtained by interacting substantially equimolecular proportions of tetrachloro- or tetrabromo-pyrimidine and an aminoazo compound which, in its free acid form is of the formula:

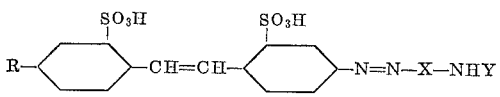

wherein R, X and Y have the meanings previously stated.

By substantially equimolecular proportions is meant such relative proportions that there is at most 20% by weight of either reactant in excess of that which represents a quantity molecularly equivalent to the quantity used of the other reactant.

Aminoazo compounds of the above formula may be obtained by coupling a diazotised amine of the formula:

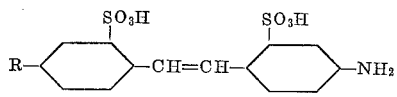

wherein R has the meaning previously stated, with an arylamine or an alkylarylamine, for example aniline (as its ω-methanesulphonate), m-toluidine, 2-methoxy-5-methylaniline, 1-naphthylamine-6-sulphonic acid, o-anisidine, 2:5-dimethoxyaniline, m-anisidine, 1-naphthylamine-7-sulphonic acid, α-naphthylamine, monomethylaniline, monoethylaniline and monobutylaniline.

As specific examples of amines of the above formula there may be mentioned

4'-chloro-4-aminostilbene-2:2'-disulphonic acid,
4'-bromo-4-aminostilbene-2:2'-disulphonic acid,
4'-nitro-4-aminostilbene-2:2'-disulphonic acid,
4'-acetamido-4-aminostilbene-2:2'-disulphonic acid,
4'-benzoylamido-4-aminostilbene-2:2'-disulphonic acid,
4'-dimethylamino-4-aminostilbene-2:2'-disulphonic acid and
4'-(5'''-sulpho-1''':2''':4'':5''-naphthatriazol-2''-yl)-4-aminostilbene-2:2'-disulphonic acid,
4'-(4'''-sulpho-1''':2''':4'':5''-naphthatriazol-2''-yl)-4-aminostilbene-2:2'-disulphonic acid,
4'-(5''':7'''-disulpho-1''':2''':4'':5''-naphthatriazol-2''-yl)-4-aminostilbene-2:2'-disulphonic acid,
4'-(3''':6''':8'''-trisulpho-1''':2''':4'':5''-naphthatriazol-2''-yl)-4-aminostilbene-2:2'-disulphonic acid.

The condensation of the tetrahalogenopyrimidine with the aminoazo compound can conveniently be carried out in aqueous medium, for example water or a mixture of water and a water-soluble organic solvent such as acetone or dioxan, at a temperature between 20° and 100° C. and preferably between 50° C. and 60° C. Preferably an acid-binding agent, for example sodium carbonate or sodium bicarbonate is added to maintain the reaction mixture neutral or at most slightly alkaline. Unreacted halogenopyrimidine can then be removed if desired, for example by steam distillation and the dyestuff can then conveniently be salted out and filtered off.

The new dyestuffs of the invention can be used to colour silk, wool, regenerated protein and cellulose textile materials for example cotton, linen and viscose rayon, by treating the textile material with an aqueous solution (which may be a thickened printing paste) of the dyestuff in conjunction with a treatment with an acid-binding agent, for example sodium hydroxide, potassium phosphate, potassium carbonate, trisodium phosphate, sodium metasilicate or sodium carbonate. The treatment with the acid-binding agent may be carried out prior to, simultaneously with or after the treatment with the dyesuff, as will be described in more detail below.

When the acid-binding agent is applied simultaneously with the dyestuff, it can conveniently be dissolved in the dyestuff solution or the printing paste containing the dyestuff.

The dyestuff solution, whether acid-binding agent is present or not, can contain commonly used dyebath adjuvants, for example sodium chloride, sodium sulphate, sodium alginate, urea and water-soluble alkyl ethers of cellulose.

The printing paste, whether acid-binding agent is present or not, can contain commonly used adjuvants, for example urea and sodium m-nitrobenzenesulphonate and thickening agents, for example methyl cellulose, starch and locust bean gum, but an alginate, for example sodium alginate is preferred as thickening agent.

Dyeing in the presence of acid-binding agent is preferably carried out at elevated temperatures, for example at temperatures between 70° C. and the boiling point of the dyestuff solution in order to improve the exhaustion and fixation of the dyestuff. Thus for example the textile material can be immersed in a dyebath comprising an aqueous solution of the dyestuff, the dyebath heated at a temperature between 70° C. and the boiling point of the dyestuff solution, the acid-binding agent added, and dyeing continued for a further period at a temperature between 70° C. and the boiling point of the dyestuff solution.

The textile material with printing paste containing acid-binding agent is preferably steamed preferably at a temperature between 100° C. and 110° C. or heated preferably at a temperature between 120° and 150° C. in order to fix the dyestuff on the textile material.

When the acid-binding agent is applied in a separate step before or after the dyestuff, it is preferably applied by treating the textile material with an aqueous solution of the acid-binding agent, for example by a padding technique. The aqueous solutions of acid-binding agents thus used can also contain dyebath adjuvants of the kind mentioned above.

Both the solution of acid-binding agent and the dyestuff solution containing the dyestuff can be applied at room temperature or at an elevated temperature, for example at temperatures between 50° C. and the boiling point of the solution of the acid-binding agent or the solution of the dyestuff, the textile material being optionally dried between the two treatments, but when dyeing protein or regenerated protein fibres in conjunction with an acid-binding agent it is preferred to use a temperature below 50° C. for example a temperature between 20° and 50° C. It is preferred to heat or steam cellulose textile materials at an elevated temperature, for example at 100° C. or at a higher temperature, for example at a temperature between 100° C. and 150° C. for a short period of time after application of dyestuff and acid-binding agent to fix the dyestuff on the textile material.

The above processes can be modified by using, in place of the acid-binding agent, a substance which on heating or steaming generates an acid-binding agent, and thereafter subjecting the textile material to heat or steam after the treatment with the dyestuff and the said substance, in order to generate the acid-binding agent.

As an example of a substance which on heating or steaming generates an acid-binding agent, there may be mentioned an alkali metal bicarbonate, for example sodium bicarbonate which on heating or steaming yields sodium carbonate, and also sodium trichloroacetate.

The amount of dyestuff present in the dyestuff solution or in the printing paste is not critical and will depend on the depth of shade which is required on the textile material. The amount of acid-binding agent or substance, which on heating or steaming liberates an acid-binding agent in the aqueous solution or in the dyestuff solution or in the printing paste is not critical but it is preferred to use between 0.2% and 2% of the acid-binding agent or substance which on heating or steaming liberates an acid-binding agent in the aqueous solution or in the dyestuff solution or between 1% and 3% in the printing paste.

The fastness to washing or subsequent wet processing of the colourations produced by the process of our invention is in general improved by a scouring treatment in for example a hot aqueous solution of soap and sodium carbonate, followed by rinsing in hot water prior to drying.

The new dyestuffs are distinguished in the following respects:

(1) In the scouring process mentioned in the previous paragraph, many reactive dyes cause staining of white materials (e.g. in the case of textile prints) in the same liquor. The new dyestuffs are remarkably free from this defect.

(2) It is sometimes desirable to store printing pastes for textile materials between printing runs. With pastes containing a reactive dyestuff, it is frequently found that the stored paste gives prints weaker than those obtained originally, due to hydrolysis of the dyestuff during the storage period. The new dyestuffs are distinguished by the stability in print pastes so that pastes containing same can, if necessary, be stored for period of weeks without noticeable deterioration in quality of the resultant printed fabrics.

(3) Those dyestuffs of the invention in which R represents a nitro group are especially valuable since the shades obtained therefrom on cellulose textile materials have a good resistance to bleach and show little or no drop in light fastness when the coloured textile material is subjected to treatments, for example impregnation with a urea-formaldehyde resin, designed to improve its resistance to creasing.

The invention is illustrated but not limited by the following examples in which the parts are by weight.

*Example 1*

5.5 parts of the disodium salt of the amino-azo compound obtained by coupling diazotised 4-amino-4'-nitrostilbene-2:2'-disulphonic acid with aniline is dissolved in 200 parts of water and added to a solution of 2.7 parts of tetrachloro-pyrimidine in 30 parts of dioxan. The mixture is stirred at between 55° and 60° C. for 4 hours and 2 N sodium carbonate solution is added at intervals to keep the solution neutral. The mixture is steam distilled to remove unreacted tetrachloropyrimidine and cooled. 25 parts of sodium chloride are added and the precipitated dyestuff is filtered off and dried.

When applied to cellulose textile materials in conjunction with an acid-binding reagent the dyestuff yields orange shades possessing very good fastness to light and to washing.

*Example 2*

5.62 parts of the disodium salt of the amino-azo compound obtained by coupling diazotised 4-amino-4'-nitrostilbene-2:2'-disulphonic acid with N-methylaniline is dissolved in 200 parts of water and added to a solution of 2.7 parts of tetrachloropyrimidine in 30 parts of dioxan. The mixture is stirred at between 55° and 60° C. for 4 hours and 2 N aqueous sodium carbonate solution is added at intervals to keep the solution neutral. The mixture is steam distilled to remove unreacted tetrachloropyrimidine and cooled. 25 parts of sodium chloride are added and the precipitated dyestuff is filtered off and dried.

When applied to cellulose textile materials in conjunction with an acid-binding reagent the dyestuff yields bright orange shades possessing very good fastness to light and to washing.

If in place of 2.7 parts of tetrachloropyrimidine in this example there is used 5.2 parts of tetrabromopyrimidine a similar dyestuff is obtained.

*Example 3*

17.5 parts of the disodium salt of 1-amino-8-naphthol-3:6-disulphonic acid is dissolved in 100 parts of water and the pH adjusted to 8 by adding sodium hydroxide. The solution is added to a solution of 10.9 parts of tetrachloropyrimidine in 75 parts of dioxan and the mixture is stirred at between 40° and 45° C. for 1 hour. The pH is adjusted to 7 by adding 2 N sodium carbonate solution and the heating is continued until the pH remains at 7 without further addition of sodium carbonate. The solution is adjusted to pH 9.5 and immediately cooled to 5° C.

To the coupling component solution so obtained, there is added a solution of the diazo compound from 22.2 parts of the disodium salt of 4-amino-4'-nitrostilbene-2:2'-disulphonic acid. The mixture is stirred below 10° C. until coupling is complete, the pH being maintained at between 8 and 9 and the product is precipitated by adding sodium chloride, filtered off and dried.

When applied to cellulose textile materials in conjunction with an acid-binding reagent the dyestuff yields violet shades which are fast to light and to washing.

*Example 4*

8.9 parts of the tetrasodium salt of the aminoazo compound obtained by coupling one molecular proportion of diazotised 4'-(5''':7'''-disulpho-1'''':2'''':4'':5''-napthatriazol-2''-yl)-4-aminostilbene-2:2'-disulphonic acid with one molecular proportion of N-methylaniline are dissolved in 250 parts of water. The solution is added to a solution of 2.7 parts of tetrachloropyrimidine in 20 parts of dioxan and the mixture stirred at 60° C. for 4 hours. The mixture is kept neutral by adding 2 N sodium carbonate solution. The mixture is cooled and 25 parts of sodium chloride are added. The dyestuff is filtered off, slurried in acetone, refiltered and dried. The product has the formula:

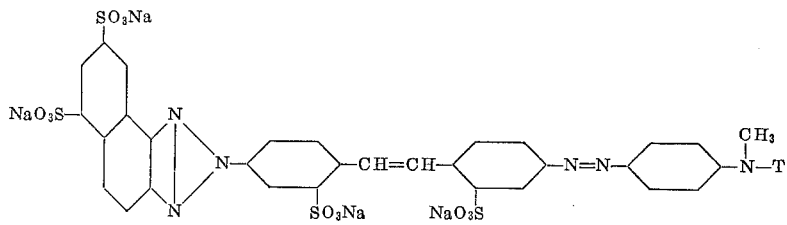

where T represents a trichlor pyrimidinyl radical.

When applied to cellulose textile materials in conjunction with an acid-binding reagent the dyestuff yields orange shades which are fast to light and washing.

The following table gives the shades of the dyestuffs obtained by coupling the diazotised amines listed in column 1 with the coupling components listed in column 2 and reacting the amino azo compounds so obtained with a stoichiometrically equivalent amount of tetrachloropyrimidine under the conditions described in Examples 1 and 2.

When applied to cellulose textile materials in conjunction with an acid-binding reagent all the dyestuffs give dyeings which are fast to washing and to light.

amino, dimethylamino and 1':2':4:5-naphthatriazol-2-yl radicals carrying substituent sulpho groups, X represents a divalent radical selected from the class consisting of 1:4-phenylene and 1:4-naphthylene radicals and such radicals on which any substituents are selected from the group consisting of methyl, methoxy, acetamido and sulpho, Y is a member of the group consisting of hydrogen and lower alkyl groups, and T represents a member of the class consisting of trichloro- and tribromo-pyridyl radical.

2. A compound of the formula:

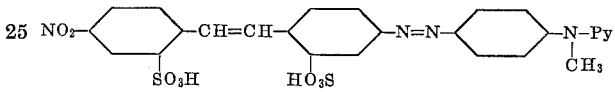

where Py represents a trichloropyrimidyl radical.

3. A compound of the formula:

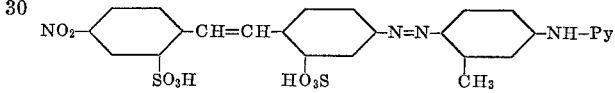

where Py represents a trichloropyrimidyl radical.

| Example | Amine | Coupling Component | Shade |
|---------|-------|--------------------|-------|
| 5 | 4-amino-4'-acetamidostilbene-2:2-disulphonic aicd. | N-methylaniline | Reddish-yellow. |
| 6 | 4-amino-4'-chlorostilbene-2:2'-disulphonic acid | do | Do. |
| 7 | 4-amino-4'-bromostilbene-2:2'-disulphonic acid | Aniline | Do. |
| 8 | 4-amino-4'-acetamidostilbene-2:2'-disulphonic acid. | 2:5-dimethoxyaniline | Orange. |
| 9 | 4-amino-4'-acetamidostilbene-2:2'-disulphonic acid. | 2-methoxy-5-methylaniline | Do. |
| 10 | 4-amino-4'-nitrostilbene-2:2'-disulphonic acid | m-Aminoacetanilide | Do. |
| 11 | 4-amino-4'-nitrostilbene-2:2'-disulphonic acid | m-Toluidine | Reddish-yellow. |
| 12 | 4-amino-4'-benzoylaminostilbene-2:2'-disulphonic acid. | N-ethylaniline | Orange. |
| 13 | 4-amino-4'-dimethylaminostilbene-2:2'-disulphonic acid. | N-methylaniline | Do. |

What we claim is:

1. Azo dyestuffs which, in the free acid form, are of the formula:

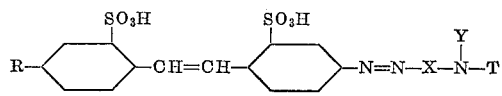

wherein R represents a substituent selected from the class consisting of chlorine, bromine, nitro, acetamido, benzoyl- 4. A compound of the formula:

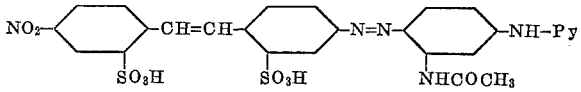

where Py represents a trichloropyrimidyl radical.

No references cited.

CHARLES B. PARKER, *Primary Examiner.*

DONALD M. PAPUGA, *Assistant Examiner.*